UNITED STATES PATENT OFFICE.

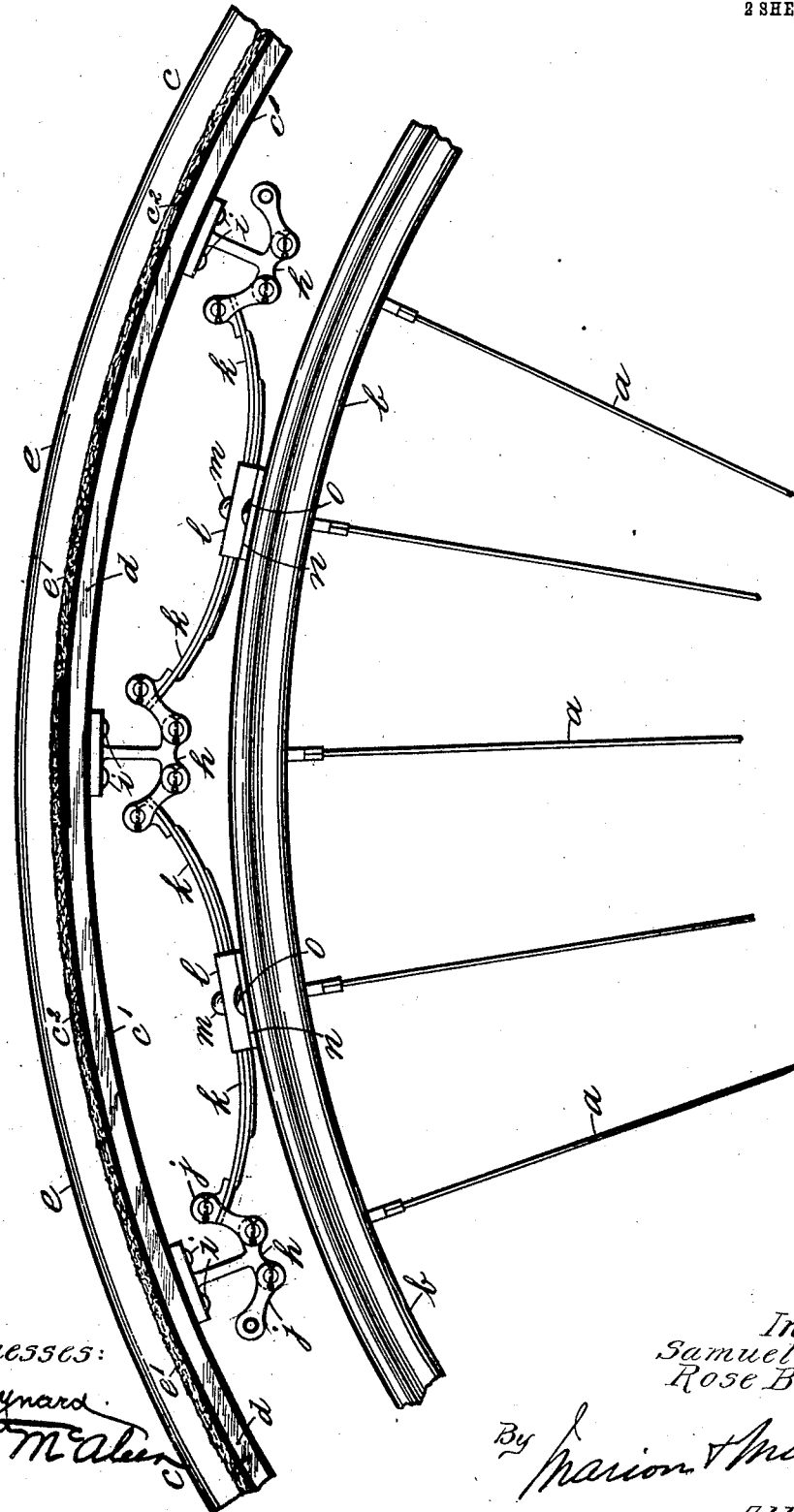

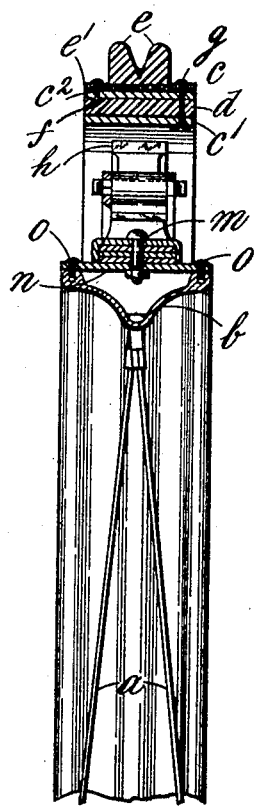

SAMUEL BASCH AND ROSE BASCH, OF LONDON, ENGLAND.

ELASTIC TIRE.

No. 849,592. Specification of Letters Patent. Patented April 9, 1907.

Application filed May 10, 1905. Serial No. 259,847.

*To all whom it may concern:*

Be it known that we, SAMUEL BASCH, a subject of the Emperor of Germany, and ROSE BASCH, wife of the said SAMUEL BASCH. both of 71 New Bond street, London, in the county of Middlesex, England, have invented a new and useful Improvement in Elastic Tires or Rims for Wheels, of which the following is a specification.

Our invention relates to improvements in elastic tires or rims for the wheels of velocipedes, motor-cycles, motor-cars, carriages, and other road-vehicles; and the objects of our improvements are to make the tires elastic, resilient, and more durable and efficient than elastic tires as heretofore made. We attain these objects by the mechanism illustrated in the accompanying drawings, in which—

Figure 1 is a front view of part of the tire, showing the outer ends of the usual wire spokes. Fig. 2 is a transverse section of a tire in which flat metal springs are used.

Similar letters refer to similar parts throughout the several views.

We use wheels having a tire, consisting of two rims—that is to say, an inner rigid rim $b$, to which are attached the outer ends of the spokes $a$ of the wheel, and an outer flexible elastic rim $c$, of considerably larger diameter, so that a space is left between the two rims $b$ and $c$, in which space are fitted elastic springs of the kind hereinafter described.

In Figs. 1 and 2, $a\ a\ a$ are the outer parts of the usual wire spokes of a cycle-wheel, the ends of which are attached to the inner rigid rim $b$, which may be of any of the usual sections, as illustrated in Fig. 2.

$c$ is the outer flexible rim, which is shown consisting of two concentric rings of flexible elastic steel $c'\ c^2$, separated by a sufficient thickness $d$, of india-rubber or other suitable flexible material.

$e$ is an outer tire, of india-rubber of any suitable section, having a flange $e'$, which is shown in Fig. 2 attached to the outer flexible ring $c^2$ by rivets or fastenings $f$, while fastenings $g$ are shown passing loosely through the flange $e'$, ring $c^2$, india-rubber $d$, and ring $c'$ and preventing them from becoming displaced while allowing sufficient freedom of movement when bending.

$h\ h$ represent double-ended brackets firmly attached to the inside of the outer flexible ring $c'$ by rivets at $i$, Fig. 1. To these double-ended brackets $h\ h$ are jointed links $j\ j$, the free ends of which are similarly jointed to the ends of springs $k\ k$, formed of separate plates of steel (like ordinary carriage-springs) and fitted in central holders or bridles $l$, which are bolted at $m$ to flat transverse plates $n$, which are supported upon the edges of the inner rigid rim $b$ and are prevented from moving out of position by pins or studs $o$. Instead of single sets two or more sets of the springs may be used side by side in combination with the double-ended brackets $h$ and links $j$.

We are aware that prior to our invention elastic rims for wheels have been made with an outer flexible tire and a concentric inner rigid rim, a space being left between them in which springs are fitted. We do not, therefore, claim such a construction broadly, but,

What we claim as our invention, and desire to secure by Letters Patent, is—

1. The combination in elastic tires or rims for road-vehicles, of an inner rigid rim $b$ carried by the spokes $a$ of the wheel, an outer flexible elastic rim $c$ of larger diameter, laminated springs $k$ attached at their center to the outer side of the inner rim $b$, double-ended brackets $h$ fixed upon the inner side of the outer flexible rim $c$, and links $j, j$, jointed at one end to the ends of the double-ended brackets $h$, and at the other end to the ends of the laminated springs $k$, substantially as set forth and illustrated in Figs. 1 and 2.

2. In combination with an inner rigid rim $b$, springs, double-ended brackets $b$, and links $j, j$, an outer flexible elastic rim consisting of two rings formed of strips $c'$, $c^2$ of flat flexible elastic steel, with a thickness of india-rubber $d$ between the adjoining rings. substantially as set forth and illustrated.

In witness whereof we have hereunto set our hands in the presence of two witnesses.

SAMUEL BASCH.
ROSE BASCH.

Witnesses:
ARTHUR E. EDWARDS,
ALFRED G. BEATTON.